US012555590B2

(12) United States Patent
Faubel et al.

(10) Patent No.: US 12,555,590 B2
(45) Date of Patent: Feb. 17, 2026

(54) SWITCHABLE NOISE REDUCTION PROFILES

(71) Applicant: Cerence Operating Company, Burlington, MA (US)

(72) Inventors: Friedrich Faubel, Ulm (DE); Jonas Jungclaussen, Ulm (DE); Markus Buck, Ulm (DE)

(73) Assignee: CERENCE OPERATING COMPANY, Burlington, MA (US)

( * ) Notice: Subject to any disclaimer, the term of this patent is extended or adjusted under 35 U.S.C. 154(b) by 487 days.

(21) Appl. No.: 17/952,432

(22) Filed: Sep. 26, 2022

(65) Prior Publication Data

US 2024/0112690 A1   Apr. 4, 2024

(51) Int. Cl.
| | |
|---|---|
| *G10L 21/0232* | (2013.01) |
| *G10L 21/0208* | (2013.01) |
| *G10L 21/0224* | (2013.01) |
| *G10L 25/03* | (2013.01) |
| *G10L 25/30* | (2013.01) |

(52) U.S. Cl.
CPC ...... *G10L 21/0232* (2013.01); *G10L 21/0224* (2013.01); *G10L 25/03* (2013.01); *G10L 25/30* (2013.01); *G10L 2021/02082* (2013.01)

(58) Field of Classification Search
CPC ............. G10L 21/0232; G10L 21/0224; G10L 25/03; G10L 25/30; G10L 2021/02082; G10L 21/0208
See application file for complete search history.

(56) References Cited

U.S. PATENT DOCUMENTS

| | | |
|---|---|---|
| 6,820,053 B1 | 11/2004 | Ruwisch |
| 2013/0329908 A1 | 12/2013 | Lindahl et al. |
| 2018/0261225 A1* | 9/2018 | Watanabe ............... G10L 15/28 |
| 2020/0075033 A1 | 3/2020 | Hijazi et al. |
| 2020/0184987 A1* | 6/2020 | Kupryjanow ....... G10L 21/0224 |
| 2022/0059112 A1 | 2/2022 | Iyer et al. |
| 2022/0059114 A1 | 2/2022 | Emanuel et al. |
| 2022/0199102 A1* | 6/2022 | Ostrand .............. H04L 65/1083 |

OTHER PUBLICATIONS

WaveNet: A Generative Model for Raw Audio by Aaron van den Oord, Sander Dieleman, Heiga Zen, Karen Simonyan, Oriol Vinyals, Alex Graves, Nal Kalchbrenner, Andrew Senior, and Koray Kavukcuoglu, from the 9th ISCA Workshop on Speech Synthesis Workshop (SSW 9), 2016) (Year: 2016).*
International Search Report and Written Opinion, PCT Application No. PCT/US2023/033462, mailed Dec. 8, 2023 (14 pages).

* cited by examiner

*Primary Examiner* — Bhavesh M Mehta
*Assistant Examiner* — Joseph J. Yamamoto
(74) *Attorney, Agent, or Firm* — Burr & Forman

(57) ABSTRACT

Disclosed are systems, methods, and other implementations for noise suppression, including a method that includes obtaining a sound signal sample, determining a noise reduction profile, from a plurality of noise reduction profiles, for processing the obtained sound signal sample, and processing the sound signal sample with a machine learning system to produce a noise suppressed signal. The machine learning system implements (executes) a single machine learning model trained to controllably suppress noise in input sound signals according to the plurality of noise reduction profiles. The processing of the sound signal sample is performed according to the determined noise reduction profile.

37 Claims, 8 Drawing Sheets

SWITCHABLE NOISE REDUCTION PROFILES

BACKGROUND

The present disclosure relates to suppression (e.g., attenuation or removal) of noise components in audio signals.

Conventional noise suppression systems typically can successfully suppress (at least to some degree) stationary noise (i.e., random noise with time-invariant noise statistical characteristics) present in an audio signal. On the other hand, such suppression systems are generally less successful in suppressing (attenuating or altogether eliminating) non-random noise components, such as human background sounds (produced by non-participants of a conversation with respect to which sound enhancement filtering is to be performed).

SUMMARY

Requirements for suppressing noise may depend to different circumstances, for example, with different contextual properties. For example, in a casual call (e.g., family call) background noises such as the chatter of kids, or sounds made by pets, etc., may be tolerated and not need to be suppressed (or at least do not need to be aggressively attenuated). On the other hand, in a business call, it may be important to suppress noise pollution as much as possible in order to maintain professional demeanor and conduct a call at an interactive quality that is as close as possible to the quality that would be achieved in an in-person meeting. Configuring noise suppression on contextual properties can increase perceived quality and appropriateness. A noise suppression system can include a noise reduction profile according to which the system is configured, and preferably that profile may be changed during operation to accommodate changes in circumstances.

The present disclosure is directed to a machine learning system (e.g., implemented as an artificial neural network ANN, for instance a deep neural network, DNN, recurrent neural network, RNN) noise reduction approach that is trained on paired clean and noisy speech signals in each of a number of different contexts, with each context corresponding to a different noise reduction profile. For instance, the system is configured to determine filter coefficients using the machine learning system trained with the paired signals and their corresponding noise profiles. These ANN-based noise suppression approaches are adapted to remove noise components in accordance with the training data (i.e., the paired speech signals and the corresponding profiles) that was used during the training stage. For example, if child voices are presented in the training corpus but not in target clean speech for a particular profile, the network will learn to suppress child voices (such as babies crying or kids playing). Similarly, the network may learn to suppress laughter or giggling of adults as well as other non-speech sounds that may be used to pronounce excitement in informal communication for another profile. The preferences of whether sounds from a child should be audible in or removed from a phone call may strongly depend on the use case. During a phone call with family members, it may be desirable to explicitly include kids' voices (so that, for example, grandparents can actually hear their grandchildren). Conversely, during a business call, it would be preferable that kids' voices, and other non-call related audio, be suppressed/attenuated.

Under the proposed approach, end users can dynamically change their noise suppression preferences by using switchable and dynamically adjustable noise suppression parameters (such as a controlling the attenuation or suppression aggressiveness levels). This approach is achieved by using a single, universal, trained machine learning model to handle all the different noise suppression behaviors required for different situations and profiles. The trained model can thus recognize a change in the needed noise suppression behavior based on profile information it receives (either directly specified by the user, or automatically detected based on contextual information) causing appropriate signaling information to be provided to the machine learning system to indicate the change in situation and/or profile), which causes the trained model to adjust its output to reflect the change of noise suppression profile or of the situational circumstances. Because only a single, universal model is used for all different noise suppression behaviors (to suppress non-stationary noise and/or stationary noise), there is no need to download different models for different situations (e.g., to use a first machine learning model to implement noise suppression behavior for a business call, and use a second model for a casual call noise suppression behavior). Consequently, changes to the noise suppression behaviors can be achieved instantly, and do not require a pause while a new model is downloaded and/or activated. The present solution also avoids costly storage requirements that would otherwise be needed if multiple machine learned noise suppression/reduction profiles were used to handle different situations.

Using switchable suppression profiles can be implemented by, a) splitting the training corpus into parts that correspond to different profiles, and b) specifying the profile as an additional input parameter to the noise reduction network. As noted, one example of a noise suppression profile is a "business call" profile where child voices and noisy sounds such as singing and giggling are suppressed (possibly along with some with outer noisy sounds, such as paper rustling, chewing and swallowing, etc.) Another profile example is a "family call" profile in which certain sounds (e.g., those deemed to be noisy sounds in a business call profile, such as children's voices and sounds) are included as part of the output, while other, undesirable, noises (e.g., a siren, or other non-human background noises) are suppressed. In yet additional examples, other profiles may concentrate on the type of device that is being used, e.g., customization to cell phones, cars, smart speakers, elevators, and so on, without the need for keeping separately trained noise reduction models for each of these devices. Further examples may include profiles configured to suppress other environmental noisy sound sources. Accordingly, under the proposed approach, a machine learning system (e.g., implemented using a neural network-based architecture) is fed a parameter(s) that contains information about a desired noise reduction profile to use. This parameter(s) is also presented to the network in the training stage. The profile information (as represented, at least in part, by the parameter) may also be used to prepare training data.

Thus, in some variations a method for noise reduction is provided that includes obtaining a sound signal sample, determining a noise reduction profile, from a plurality of noise reduction profiles, for processing the obtained sound signal sample, and processing the sound signal sample with a machine learning system to produce a noise suppressed signal. The machine learning system implements/executes a single machine learning model trained to controllably suppress noise in input sound signals according to the plurality of noise reduction profiles. The processing of the sound signal sample is performed according to the determined noise reduction profile.

Embodiments of the method may include at least some of the features described in the present disclosure, including one or more of the following features.

Processing the sound signal with the machine learning system may include determining, by the machine learning system, filter coefficients for a time-varying linear filter based on at least part of the sound signal sample and the determined noise reduction profile, and applying the determined filter coefficients to the at least part of the sound signal sample to yield a noise suppressed signal.

The machine learning system may include an artificial neural network.

The noise reduction profile may include at least one identifier with a value selected from a discrete set of values that each represents a different one of a plurality of profile types requiring different noise reduction behavior.

The plurality of noise reduction profiles may include one or more of, for example, a business call profile configured to suppress sounds produced by sources different from an intended speaker of a business call, a family call profile configured to include sounds produced by multiple participants located at one end of a family-related call, a hands-free call profile, a single-speaker profile, a multi-speaker profile, a profile for a call conducted from a car, a profile for a call conducted from a conference room, and a voice-recognition profile configured to suppress noise to allow voice recognition of one or more participants of a call to be recognized.

Determining the noise reduction profile may include selecting the noise reduction profile from the plurality of noise reduction profiles according to an input parameter, provided to the machine learning system, specifying the noise reduction profile.

The noise reduction profile may include at least one noise suppression property identifier representative of characteristics of desired level of noise suppression.

The at least one noise suppression property identifier may be set to a value from a range of values representative of aggressiveness level at which noise suppression processing is to be performed.

Determining the noise reduction profile may include determining contextual information associated with a sound source, and determining the noise reduction profile based, at least in part, on the determined contextual information associated with the sound source.

Determining the contextual information may include one or more of, for example, deriving one or more elements of the contextual information based on sensor data measured by one or more sensors, and/or receiving user information, via a user interface device, representative of one or more other elements of the contextual information.

Obtaining the sound signal sample may include converting, by an acoustic transducer device, a raw sound sample into a time-domain sound signal, applying input processing to the time-domain sound signal to produce a resultant processed representation, and extracting features from the resultant processed representation to produce the sound signal sample processed by the machine learning system.

Applying input processing to the time-domain sound signal may include one or more of, for example, performing signal conditioning on the time-domain sound signal, transforming the time-domain sound signal into a transformed domain representation, performing echo cancellation on the time-domain sound signal, and/or performing beamforming or array signal processing on the time-domain sound signal.

Transforming the time-domain sound signal into the transformed domain representation may include transforming the time-domain sound signal into a frequency-domain representation on which frequency-domain noise reduction filtering, generated by the machine learning system, is applied.

Extracting the features may include deriving one or more of, for example, complex signal spectra features, spectral magnitude features, log spectral magnitude features, log mel spectra features, and/or mel-frequency cepstral coefficients.

The machine learning system may be trained to controllably suppress noise by configuring coefficients of the machine learning system according to input noisy training samples, respective input noise reduction profiles corresponding to the input noisy training samples, and corresponding output training samples in which at least some noise components of the input noisy training samples have been suppressed according to the corresponding input noise reduction profiles.

At least one of the input noisy training samples may be synthesized from a clean input sound sample combined with respective separate independent noise signals, and the corresponding output training samples may include the clean input sound sample.

The method may further include determining at a later time a different noise reduction profile, from the plurality of noise reduction profiles, for processing subsequently obtained one or more sound signal samples, and processing the subsequently obtained one or more sound signal samples with the machine learning system according to the different noise reduction profile, with the machine learning system being configured with a universal set of parameters, defining operation of the machine learning system, that are used for all of the plurality of the noise reduction profiles.

In some variations, a noise reduction system is provided that includes an audio acquisition section to obtain a sound signal sample, a machine learning engine configured to perform noise reduction operations on audio samples, and a noise reduction controller in electrical communication with the audio acquisition section. The noise reduction controller is configured to determine a noise reduction profile, from a plurality of noise reduction profiles, for processing the obtained sound signal sample, and process the sound signal sample with the machine learning engine. The machine learning engine executes/implements a single machine learning model trained to controllably suppress noise in input sound signals according to the plurality of noise reduction profiles. Processing of the sound signal sample is performed according to the determined noise reduction profile.

In some variations, a non-transitory computer readable media is provided that includes computer instructions, executable on a processor-based device, to obtain a sound signal sample, determine a noise reduction profile, from a plurality of noise reduction profiles, for processing the obtained sound signal sample, and process the sound signal sample with a machine learning system to produce a noise suppressed signal, the machine learning system executing a single machine learning model trained to controllably suppress noise in input sound signals according to the plurality of noise reduction profiles. The processing of the sound signal is performed according to the determined noise reduction profile.

Embodiments of the system and non-transitory computer readable media may include at least some of the features described in the present disclosure, including the above features for the first method.

In some variations, another method is provided that includes determining a plurality of noise reduction profiles, and generating a plurality of training data sets for the plurality of noise reduction profiles, each of the plurality of training data sets comprising an input noisy training sample with respective one or more noise components, profile data representative of a respective noise reduction profile to be applied to the input noisy training sample, and a respective output training sample in which at least part of the one or more noise components is attenuated. The method further includes configuring, using the plurality of training data sets, a machine learning system executing a single machine learning model to controllably suppress noise components included in input sound samples according to input noise reduction profiles from the plurality of noise reduction profiles.

Embodiments of the other method may include at least some of the features described in the present disclosure, including any of the above features for the first method, the first system, and the first computer readable media, as well as one or more of the following features.

Generating the plurality of training data sets may include obtaining an initial clean sound sample, and synthesizing, for at least one of the plurality of training data sets, the input noisy training sample by combining the initial clean sound sample with a noise signal selected from a database of noise components, the selected noise signal corresponding to the profile data for the at least one of the plurality of training data sets. The respective output training sample for the at least one of the plurality of training data sets may be the obtained initial clean sound sample.

The method may further include applying to the initial clean sound sample one of a plurality of impulse response filters, representative of noise characteristics in different environments, to produce a filtered sound sample. Synthesizing the input noisy training sample may include combining the filtered sound sample with the selected noise signal.

Obtaining the initial clean sound sample may include recording an audio segment, and filtering the recorded audio segment with one or more filters to attenuate one or more stationary noise components included in the recorded audio segment.

The plurality of noise reduction profiles may include one or more of, for example, a business call profile configured to suppress sounds produced by sources different from an intended speaker of a business call, a family call profile configured to include sounds produced by multiple participants located at one end of a family-related call, a hands-free call profile, a single-speaker profile, a multi-speaker profile, a profile for a call conducted from a car, a profile for a call conducted from a conference room, and/or a voice-recognition profile configured to suppress noise to allow voice recognition of one or more participants of a call to be recognized.

The machine learning system configured to controllably suppress noise components included in input sound samples may be configured to determine filter coefficients for a time-varying linear filter based on at least part of the input sound samples and one or more of input noise reduction profiles, and to apply the determined filter coefficients to the at least part of the input sound samples to yield a noise suppressed signal.

In some variations, a machine learning training system is provided that includes one or more memory storage devices to store audio samples training data, a machine learning engine configured to perform noise reduction operations on audio samples, and a controller. The controller is configured to determine a plurality of noise reduction profiles, and generate a plurality of training data sets for the plurality of noise reduction profiles, each of the plurality of training data sets comprising input noisy training sample with respective one or more noise components, profile data representative of a respective noise reduction profile to be applied to the input noisy training sample, and a respective output training sample in which at least part of the one or more noise components is attenuated. The controller is further configured/adapted to configure, using the plurality of training data sets, the machine learning engine to implement a single machine learning model to controllably suppress noise components included in input sound samples according to input noise reduction profiles from the plurality of noise reduction profiles.

In some variations, another non-transitory computer readable media is provided that includes computer instructions, executable on a processor-based device, to determine a plurality of noise reduction profiles, and generate a plurality of training data sets for the plurality of noise reduction profiles, each of the plurality of training data sets comprising an input noisy training sample with respective one or more noise components, profile data representative of a respective noise reduction profile to be applied to the input noisy training sample, and a respective output training sample in which at least part of the one or more noise components is attenuated. The computer instructions further cause the processor-based device to configure, using the plurality of training data sets, a machine learning system that executes/implements a single machine learning model to controllably suppress noise components included in input sound samples according to input noise reduction profiles from the plurality of noise reduction profiles.

Embodiments of the machine learning training system and the other computer-readable media may include at least some of the features described in the present disclosure, including the above features for the first and second methods, the first system, and the first computer-readable media.

Other features and advantages of the invention are apparent from the following description, and from the claims.

BRIEF DESCRIPTION OF THE DRAWINGS

These and other aspects will now be described in detail with reference to the following drawings.

Like reference symbols in the various drawings indicate like elements.

DETAILED DESCRIPTION

The proposed framework described herein implements an adjustable/switchable noise suppression platform that can adapt its noise suppression behavior (in terms of the levels of attenuation applied to stationary and non-stationary noise components) in accordance with user input and/or the context and circumstances of a call. The framework is implemented as a machine learning network that is trained (i.e., has its machine learning engine parameters optimized) to produce clean output in response to noisy output, based on one or more parameters indicating the context or profile (i.e., suppression behavior) required for particular call profiles. The machine learning implementation (e.g., which may be based on different neural network architectures) receives noisy audio segments and input parameters representative of the desired noise reduction profile to be used (be it contextual data from which the desired profile can be inferred, or explicit indication of the desired profile), and outputs data (e.g., noise reduction filter coefficients) that cause the desired clean data (noise-suppressed, or even noise-free) to be produced. The input parameters provided to the machine learning system act as "tuning" parameters that allow for adjustment of the noise reduction behavior (and thus a change of the call output being produced) in real-time. In other words, the profile parameters can be changed during operation time (runtime), thus allowing the behavior of the machine learning system to be controlled without the need to load a new set of machine learning parameters (e.g., a new DNN parameter set). As will be discussed in greater detail below, training data (defining the ground truth for the machine learning noise suppression system) can be generated by combining clean audio data with separately recorded or synthesized non-stationary and stationary noise components, and including with the audio samples parameter data representative of the profile that is associated with the input training data. The training data also separately includes the desired output data, which corresponds to the clean audio data.

Accordingly, the present framework implements noise suppression systems and methods to obtain a sound signal sample, determine a noise reduction profile, from a plurality of noise reduction profiles, for processing the obtained sound signal sample, and process the sound signal sample with a machine learning system, with the machine learning system executing a single machine learning model trained to controllably suppress noise in input sound signals according to the plurality of noise reduction profiles, and with the processing of the sound signal being performed according to the determined noise reduction profile.

Figure 1:
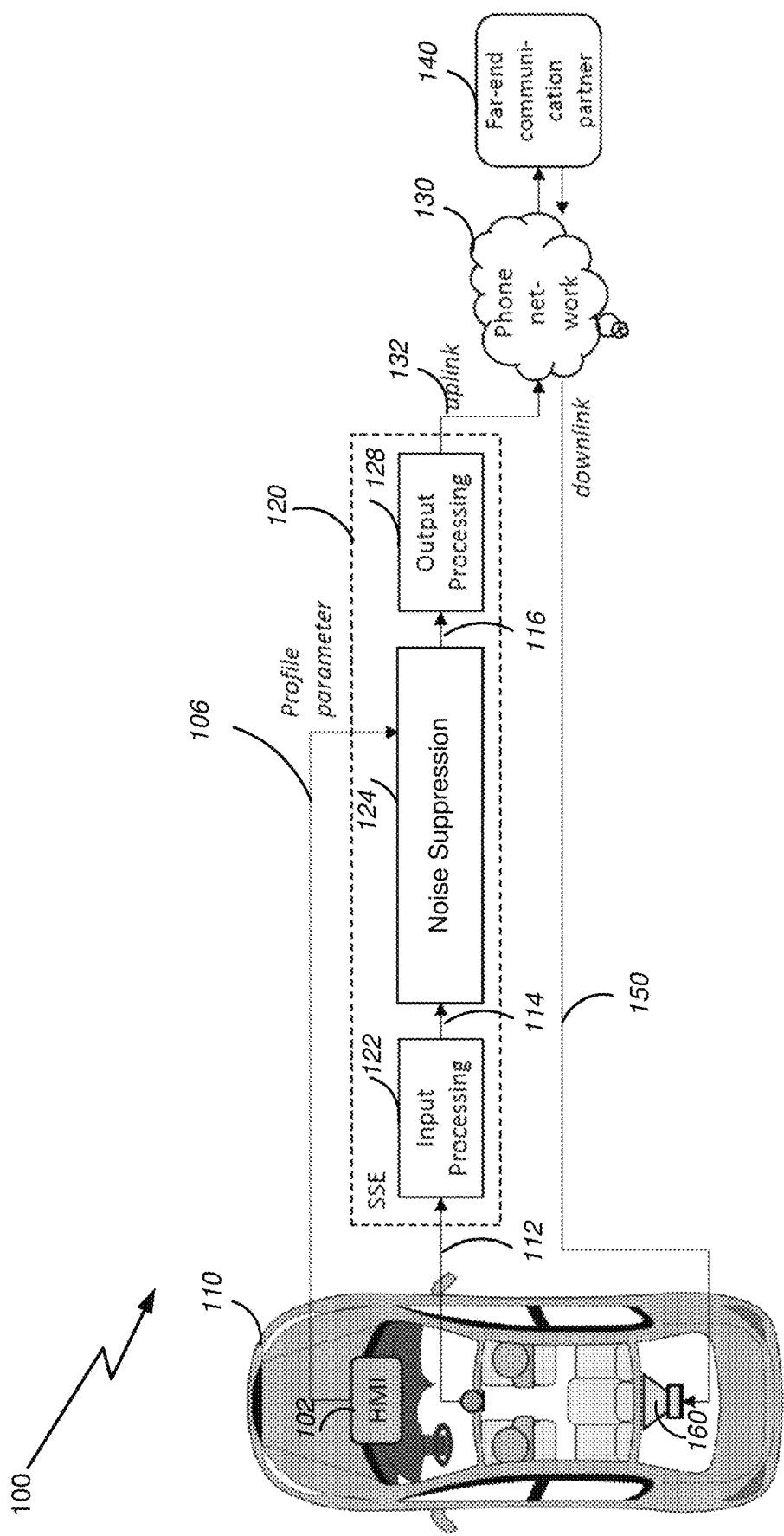
FIG. 1 is a schematic diagram of an example noise suppression system.

Thus, with reference to FIG. 1, a diagram of an example noise suppression system 100 is shown. The system 100 is configured to establish and manage a communication link between a car 110 and a destination node 140, at which a far end communication partner is situated, via an intermediate phone network 130 (typically a network comprising wireless nodes providing access to and from access points or base stations to users having mobile wireless devices, and wired nodes and links to carry communication data). While FIG. 1 depicts an environment in which occupants of a car communicate with a remote participant (who may be equipped with a wired or wireless communication device), the proposed approaches may also be used in relation to other types of environments where call participants are located (e.g., home, office, public places, etc.), and the framework described herein may similarly be used (or adapted) to implement appropriate noise suppression functionality within such environments.

As further illustrated in FIG. 1, the system 100 includes a speech signal enhancement (SSE) unit (circuitry) 120 to process an audio signal(s) 112 generated during a call by the call participant(s), with such audio signals including noisy components (e.g., both stationary and non-stationary noise components). The signal(s) 112 is provided as an electrical (possibly digitized) signal from an acoustic transducer device (e.g., microphone, also referred to as an audio acquisition section, not shown in FIG. 1) that converts raw acoustic signals detected or sensed in the car 110 (or within some other call environment) into a time-domain sound signal. When digitized, the conversion of the raw acoustic signal into a digitized signal may be performed using an analog-to-digital converter (ADC, not shown in FIG. 1). The time-domain signal representation of the signal 112 may first be processed by an input processor 122 (also referred to as input processing unit) configured to perform one or more signal processing operations on the input time-domain signal 112. For example, the input processor 122 may be configured to perform signal conditioning on the time-domain sound signal, transform the time-domain sound signal into a transformed domain representation, perform echo cancellation on the time-domain sound signal, and/or perform beamforming or array signal processing on the time-domain sound signal. For instance, signal conditioning may include performing such operations as gain equalization (to produce a uniform, or near uniform, gain spectrum), latency adjustment, and other type of conditioning and filtering operations performed on the input audio signal. In another example, to perform the signal suppression operation, it may be desirable to process the signal in a frequency domain instead of in the time-domain (e.g., in order to configure and then apply the machine learning engine to features derived frequency domain components based on which the trained predicted output of the machine learning engine is produced). Thus, in various embodiments, the input processor 122 is configured to transform the time-domain sound signal into the transformed domain representations such as Discrete Fourier Transform representation (e.g., performed through a Fast-Fourier Transform process), or any other frequency representation of segments of the time-domain audio signal. As noted, another process that may be implemented by the input processor 122 is to perform echo suppression or cancellation operations. Such operations may be implemented, for example, by detecting echo components included with the acoustic signal, and attenuating or removing those echo components. In various examples, the input processing may be applied to segments or blocks of a time-domain audio signal, e.g., blocks/segments with lengths of 16 ms, and a sample rate of 16 KHz.

As noted, the input processor 122 is configured to remove some channel-based noise (e.g., echoes) and transform a time-domain representation into a frequency-domain representation, thus producing a frequency-domain signal 114. As further illustrated in FIG. 1, the SSE 120 includes a noise suppression unit 124 (also referred to as a noise reduction unit), typically implemented as a machine learning system, configured to perform noise suppression. As will be discussed in greater detail below in relation to FIG. 2, the noise suppression unit 124 generally includes a feature extraction unit (the unit 210 depicted in FIG. 2) that derives from the frequency domain representation extracted features that are sequentially fed into a machine learning engine (e.g., an artificial neural network such as a deep neural network (DNN), illustrated as DNN 220 in FIG. 2) trained using similarly extracted features of the training data. Examples of features extracted from the frequency representation signal 114 include complex signal spectra features, spectral magnitude features, log spectral magnitude features, log mel spectra features, mel-frequency cepstral features, etc. Other types of features, whether time-domain features, frequency domain features, or features extracted from some other type of representation of the audio data, may also be used. After extracting features that are to be processed in order to perform noise suppression on the input signals to produce "cleaned" audio samples, the extracted features are provided as input to the machine learning engine, along with one or more profile parameters 106 representative of information that controllably causes the output of the DNN of the noise suppression unit 124 to produce filter coefficients (e.g., time-variant filter coefficients implementing filters such as a Wiener filter, or some other filter(s) to suppress stationary and non-stationary noise) consistent with noise suppression behavior appropriate for the current circumstances of the call. Examples of different situations (requiring different noise reduction profiles or behaviors) include:

- a business call profile configured to suppress sounds produced by sources different from an intended speakers of the business call;
- a family call profile configured to include sounds produced by multiple participants located at one end of a family-related call (for both the business call and family call situation, as well as for other conversation mode situations, the training of the machine learning model can be performed with or without human sounds such as laughter or chatter);
- a conference mode profile, in which the machine learning model is trained with a single or multiple speakers;
- a hands-free call profile;
- different environment profiles such as a phone environment, a car environment, or a conference room environment, in which the machine learning model is trained with speech that was generated with impulse responses that correspond to the particular environment types (taking into account such factors as room-type, dimensions and configurations of the space in which the call is held, etc.);
- a voice-recognition profile configured to suppress noise to allow voice recognition of one or more call participants to be recognized. In this situation the machine learning model is trained for usage in a voice recognition software during a phone call).

Additional noise reduction profiles, and the training data required to implement such profiles, can be developed to handle many other different situational and environmental settings.

The noise reduction/suppression profile information may be provided (via, for example, a human-machine interface (HMI) 102, through which one of the participants interacts with the SSE 120) in the form of one or more parameters based on which the appropriate noise suppression behavior is determined. In a first example, the particular noise suppression/reduction behavior of the SSE (and more particularly the DNN 220 of the noise suppression unit 124) may be determined (selected) according to a user-specified parameter identifying one of multiple profiles (or noise reduction situations) that adjust the behavior of the trained machine learning engine. For instance, the user (call participant) may specify that the call in which the user participates is a business call. In response to that input, the machine learning engine is configured to produce output corresponding to a business call situation, e.g., noise suppression filter behavior that reduces or eliminates at least some non-stationary noise components such as speech produced by persons not involved in the call. Other call situations, as may be indicated by a user-specified parameter provided to the noise suppression unit 124 via HMI 102, will controllably cause the DNN of the noise suppression unit to adjust its output to be commensurate with the user-specified parameter. The profile information determined and provided to the noise suppression unit 124 (and more particularly to its DNN unit) may comprise multiple parameters (defining a profile information vector), and may include, for example, a parameter indicating a type of call that is to be (or is being) conducted, an environment parameter identifying the environment in which the call is conducted (e.g., in a car that has a hands-free device, a phone held closely to the user's mouth, a conference room, etc.), and/or an aggressivity parameter to control the level of attenuation that is to be applied. Other parameters that help define the required noise reduction behavior may also be included or specified.

In another example, the noise reduction profile information provided to the DNN of the noise suppression unit 124 may be determined automatically based on contextual information that can be gathered or measured by the HMI 102. For instance, the HMI 102 (which may be implemented as a processor-based device, optionally realized as a learning machine implementation, in communication with one or more sensors) may determine the noise reduction profile information by determining contextual information associated with various sound sources in the vicinity of the HMI 102, and determining based on that contextual information the particular noise reduction profile (or behavior) that should be in effect. In this example, determining the noise reduction profile may include one or more of deriving one or more elements of the contextual information based on sensor data measured by one or more sensors (e.g., optical and/or acoustic sensors that can sense visual or acoustic information based on which the number of persons, their relative locations, possibly the persons' ages, and all other information germane to the particular noise reduction behavior desired), and/or receiving user information (e.g., via the HMI 102) representative of one or more other elements of the contextual information. Such user information may include calendar information (which may identify pre-scheduled meetings, subject matter of the call, and so on). It is to be noted that noise reduction profile information (whether specified expressly by the user/participant, or determined automatically based on contextual information) can be changed while the call is in progress (e.g., during runtime). For example, a call that starts as a business call may transition to a more casual call at some point when the substantive discussion has concluded, and a more casual personal discussion ensues. For example, a call that was conducted in a car in which the participant's kids were also present may have started with a noise suppression behavior in which non-stationary noise produced by the kids was suppressed (e.g., attenuated at a level commensurate with the profile selected). However, once the business portion of the discussion has ended, and the participants engage in small talk (e.g., asking about the wellbeing of the participants' families), the call participant in the car may specify (or the HMI 102 may determine) that a casual noise reduction profile is appropriate, and the noise reduction behavior is changed so that some of the audio produced by the kids is audible to the participant at the other end of the call. The specification of a different noise reduction profile simply causes the machine learning (ML) noise suppression unit 124 (and more particularly the DNN of the noise suppression unit, such as the DNN 220 depicted in FIG. 2) to produce, in response to a different profile parameter, filter coefficients (as more particularly described below) for the new profile, but without requiring the DNN of the noise suppression unit 124 to load a new set of DNN parameters dedicated to the updated noise reduction profile behavior, thus avoiding runtime delay that would result from having to download a different set of DNN parameters.

In addition to providing information that is used to identify/select the appropriate noise reduction profile that should be applied for a call, the information may also include data (in the form of one or more parameters) to further refine and modulate characteristics/properties of the noise reduction behavior that is to be used. For example, the information provided may include an aggressivity level parameter (e.g., with a value set to a value from a range of discrete values) representative of aggressiveness level at which noise suppression processing is to be performed.

In this example, the aggressivity parameter can have a value representative of, for instance, low, moderate, and high (or can optionally have additional gradations/levels to more finely control the noise suppression operation). For the low, moderate, high scale, the aggressivity parameter may be assigned a value of −1 (for low), 0 (for normal), or 1 (for high). Of course, other values to represent this parameter may be used. Other characteristics of the noise reduction behavior may also be included in the information provided as input to the DNN of the ML noise suppression unit 124.

The DNN of the noise suppression unit receives as input profile information representative of the noise reduction behavior that should be applied, along with extracted features representative of a block/segment of an audio sample, and produces in response to these inputs a set of filter coefficients that are applied to the audio sample. The audio sample processed by the DNN-generated filter coefficients may be the original noisy sample, or a sample on which some of the initial pre-processing operations, such as echo cancellation, equalization, etc., have been performed. Alternatively, the filtering process, achieved by filter coefficients produced by the DNN of the noise suppression unit 124, may be performed in a frequency-domain, producing a resultant filtered (noise suppressed) signal from the input signal provided to the SSE 120. It is to be noted that while the computation of filter coefficients to apply to noisy audio samples may be performed for every audio block/segment of the audio signals (e.g., 16 ms blocks), the computation of filter coefficient sets by the DNN may only need to be performed intermittently (e.g., at regular or irregular intervals) so that the filter coefficients derived in response to a particular audio segment are applied to one or more consecutive audio blocks that follow the block that was processed by the ML noise suppression unit 124. By computing filter coefficients intermittently instead of for every incoming audio block/segment, the computation cost (and resultant latency) can be reduced without excessively compromising the speech quality of the audio output signal.

With continued reference to FIG. 1, having applied the derived noise reduction filter coefficients to a noisy audio segment/block, resultant noise reduced signal 116 (typically in a frequency-domain representation) is provided to an output processing unit 128. The output processing unit 128 is configured to perform various post-filtering operation including, for example, equalization operations, automatic gain control (AGC) operation, inverse transformation operations (e.g., inverse FFT) to convert the processed signal from a frequency domain representation to a time-domain representation, compression and/or encryption operations, etc.

Once output processing is performed, the resultant processed (noise reduced) data is communicated, via uplink 132 to communication network 130 for delivery to the far-end communication partner at the node 140. There, a user located at the destination node may use a similar noise reduction system to the SSE 120 to suppress any noise/interference generated at the destination according to the environment and noise reduction profile at the destination. Audio signals produced by the user at the far-end location is processed and transmitted via the communication network 130 and downlink 150 to the first participant at the car 110 (where the audio signal communicated from the far end is converted to an acoustic signal using a transducer (speaker) 160).

It is to be noted that at least some of the modules constituting the system 100, such as the various parts of the SSE 120, the HMI 102, etc., may be part of, or may be controlled by, a controller module (also referred to as a noise reduction/suppression controller) that manages the overall control operations of the system 100. Such control operations may include the operations and functionality to determine the specific noise reduction profile to use, to generate filter coefficients applied to the sound signal representation being processed, to train the machine learning engine of the SSE unit, and other functions.

Figure 2:
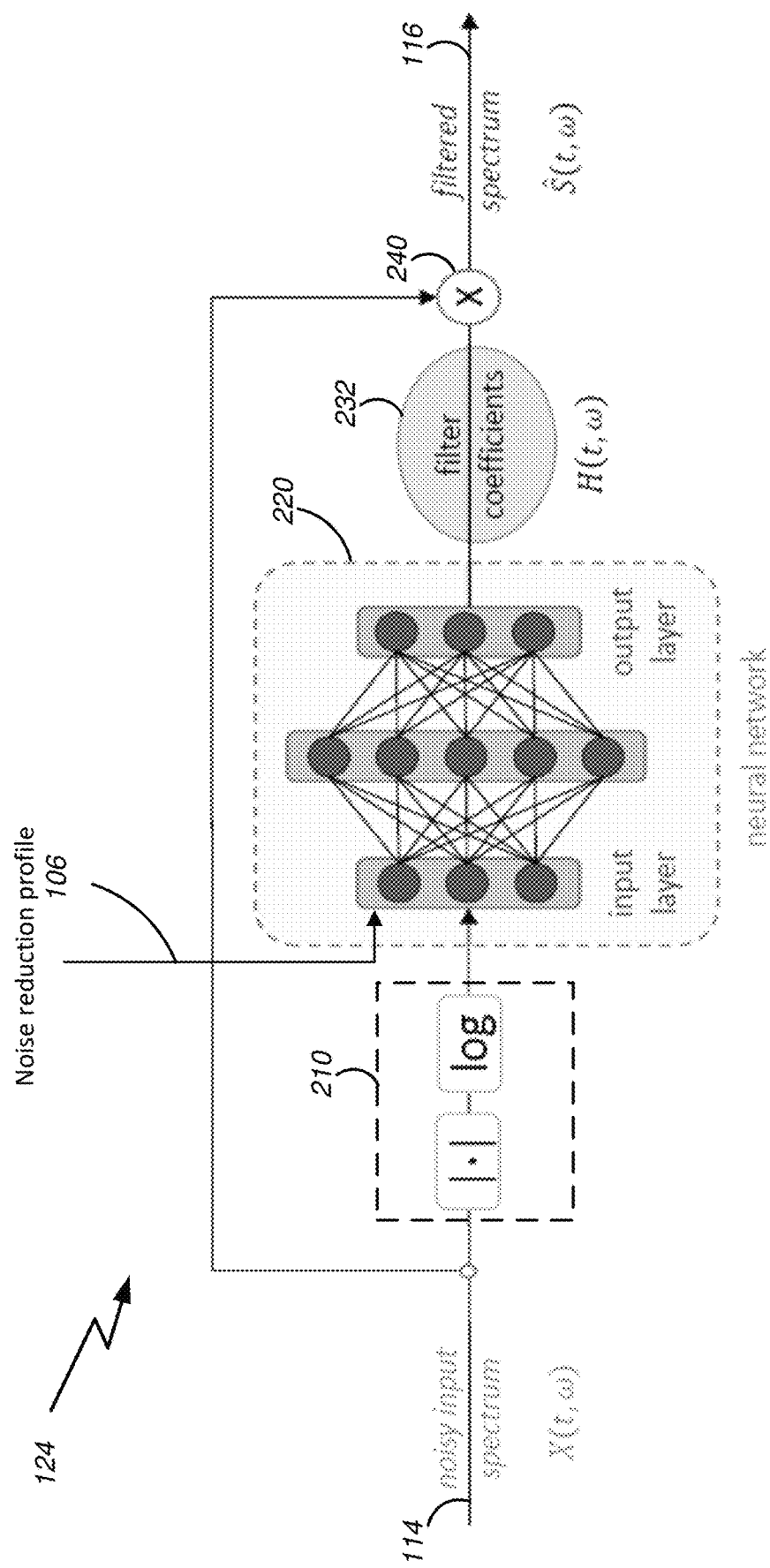
FIG. 2 is a schematic diagram of an example machine learning architecture for implementing a noise reduction/suppression system.

Additional details of the configuration and operation of a machine learning system implemented by the ML noise suppression unit 124 are provided with reference to FIG. 2 showing a schematic diagram of an example machine learning architecture used to implement the noise suppression unit 124 of FIG. 1 to controllably and dynamically configure the machine learning architecture to process audio signals according to one of multiple noise reduction profiles (corresponding to respective noise reduction behaviors). As illustrated, the architecture of FIG. 2 includes a unit (section) 210 representing feature extraction operations (e.g., to provide compact, sequential input based on the processes input signal). The output of the unit 210 is provided to a DNN 220, which is represented as a neural network with multiple layers (at least one of which is a hidden layer). In an example embodiment, the features extracted from a noisy input signal (represented as a spectrogram X $(t,\omega)$, which may have been derived from a time-domain signal at a stage preceding the unit 210) are provided, along with noise reduction profile information 106 (also shown and discussed in relation to FIG. 1) to the DNN 220 which produces, in response to the extracted features from the noisy input and the noise reduction profile information provided by the user (or by a user-interface), a set of noise reduction filter coefficients 232, defining a filter $H(t,\omega)$, that are applied (by an operator 240) to the noisy input $X(t,\omega)$, to produce an output signal $S(t,\omega)$ (marked as output 116) corresponding to a "cleaned" (filtered) audio signal with at least some of the noise (non-stationary and stationary noise) removed or suppressed in accordance with the selected noise reduction profile. Thus, the filter coefficients 232 for $H(t,\omega)$ produced by the DNN 220 are dynamically adaptable in response to specific dynamic audio signal characteristics (represented by the extracted features fed to the DNN 220), and required noise suppression behavior (as may be directly determined by a participating user, or automatically determined by a user interface). The DNN 220 is thus a universal, adaptable noise reduction module that does not need to retrieve (i.e., from a look-up table) different sets of coefficients for different required profiles (or for different audio signal characteristics), but rather is implemented using a single set of optimized DNN coefficients, determined during the training stage, to produce filter coefficients that are applied to noisy input audio signals.

The DNN 220 of FIG. 2 is depicted as realized based on a neural network architecture. However, the DNN 220 may be replaced by other types of machine learning approaches/ architectures. Neural networks are in general composed of multiple layers of linear transformations (multiplications by a "weight" matrix), each followed by a nonlinear function (e.g., a rectified linear activation function, or ReLU, etc.) The linear transformations are learned during training by making small changes to the weight matrices that progressively make the transformations more helpful to the final learned task.

Examples of neural networks include convolutional neural network (CNN), feed-forward neural networks, recurrent neural networks (RNN, implemented, for example, using long short-term memory (LSTM) structures), etc. Feedforward networks include one or more layers of perceptrons (learning nodes/elements) with connections to one or more portions of the input data. In a feedforward network, the connectivity of the inputs and layers of perceptrons is such that input data and intermediate data propagate in a forward direction towards the network's output. There are typically no feedback loops or cycles in the configuration/structure of the feed-forward network. Convolutional layers allow a network to efficiently learn features by applying the same learned transformation to subsections of the data. Other examples of learning engine approaches/architectures that may be used include generating an auto-encoder and using a dense layer of the network to correlate with probability for a future event through a support vector machine, constructing a regression or classification model, etc.

In various embodiments the learning engine implementations may include a trained learning engine (e.g., a neural network) and a corresponding coupled learning engine controller/adapter configured to determine and/or adapt the parameters (e.g., neural network weights) of the learning engine that would produce output representative of cleaned/ filtered audio samples in response to noisy input audio data and/or noise reduction profile information. In such implementations, training data includes sets of input audio sample representations (clean samples and noisy samples, in one of a time-domain representation, a transformed domain representation, or extracted features representation) along with corresponding output data comprising desired filtered (cleaned) audio sample representations (such output data is referred to as target or label data). The input and output training data together define the ground truth for the machine learning model being implemented. After initial training of the learning engine, subsequent training may be intermittently performed (at regular or irregular periods). Upon completion of a training cycles by the adapter/controller coupled to a particular learning engine, the adapter provides data representative of updates/changes (e.g., in the form of parameter values/weights to be assigned to links of a neural-network-based learning engine) to cause the learning engine to be updated in accordance with the training cycle(s) completed.

During training neural network errors are computed based on distance between network output (responsive to the input data) and the desired target. Based on this error, the neural network weights are optimized with, for example, gradient descent processing to minimize the error. Consider, for example, an embodiment in which the filter coefficient for $H(t,\omega)$ that are to be derived (predicted) by the machine learning engine (implemented by the DNN 220) are ideal Wiener filter coefficients (other types of filters may be implemented in the proposed framework in place of Wiener filters). Generally, Wiener filters minimize the mean square error under certain assumptions regarding the input signals (e.g., Gaussian distribution and stationarity of the noise signals). The behavior of an ideal Wiener filter can be represented as:

$$H(t, \omega) = \frac{|X(t, \omega)|^2 - |N(t, \omega)|^2}{|X(t, \omega)|^2}.$$

In various example embodiments of the noise reduction framework described herein, the training of a machine learning engine to remove noise may be performed by corrupting an initially produced clean audio sample with noise components (stationary and non-stationary noise), and deriving filter coefficients that produce from the corrupted, noisy signal the originally produced clean audio sample representation. Under this approach, the filter behavior can be represented as follows:

$$H(t, \omega) = \frac{|S(t, \omega)|^2}{|X(t, \omega)|^2} = 1 - \frac{1}{1 + \left(\frac{|S(t, \omega)|}{|N(t, \omega)|}\right)^{\alpha=2}}$$

where $S(t,\omega)$ is the true clean speech (audio) signal and $N(t,\omega)$ is the noise components of the noisy speech signal $X(t,\omega)$.

Figure 3:
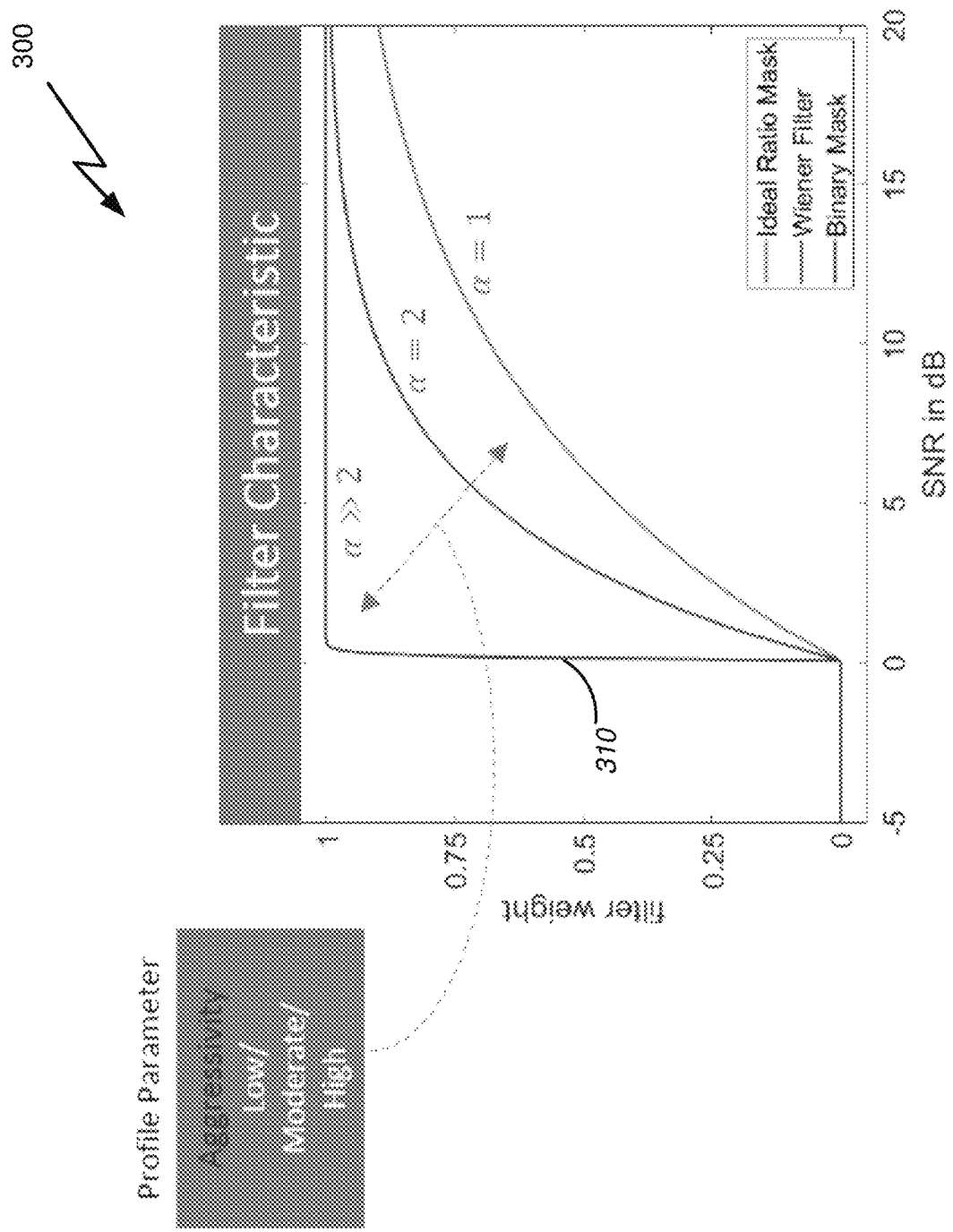
FIG. 3 is a graph showing different filter behaviors for different values of an aggressivity factor $\alpha$.

In the above expression for the behavior of the Wiener filter $H(t,\omega)$, the exponent, $\alpha$, applied to the ratio of the clean audio signal $S(t,\omega)$ and the noise component $N(t,\omega)$ is 2. This exponent can be used to represent the aggressivity level, a, of the noise reduction behavior to be realized by the DNN 220. The aggressivity of a noise reduction can be controlled through the exponent in the general calculation of the filter coefficients. FIG. 3 includes a graph 300 showing different filter behaviors for different values of the aggressivity factor $\alpha$. For example, graph curve 310 illustrates that for a value of $\alpha>>2$, the noise reduction filtering behavior approximates the behavior of a binary mask. It is to be noted, however, that in various other example embodiments, control of the aggressivity of the noise reduction behavior may be implemented in other ways (e.g., weighing filter coefficients produced by the DNN 220 according to some predetermined scheme that is based on the value of the parameter a).

Figure 4:
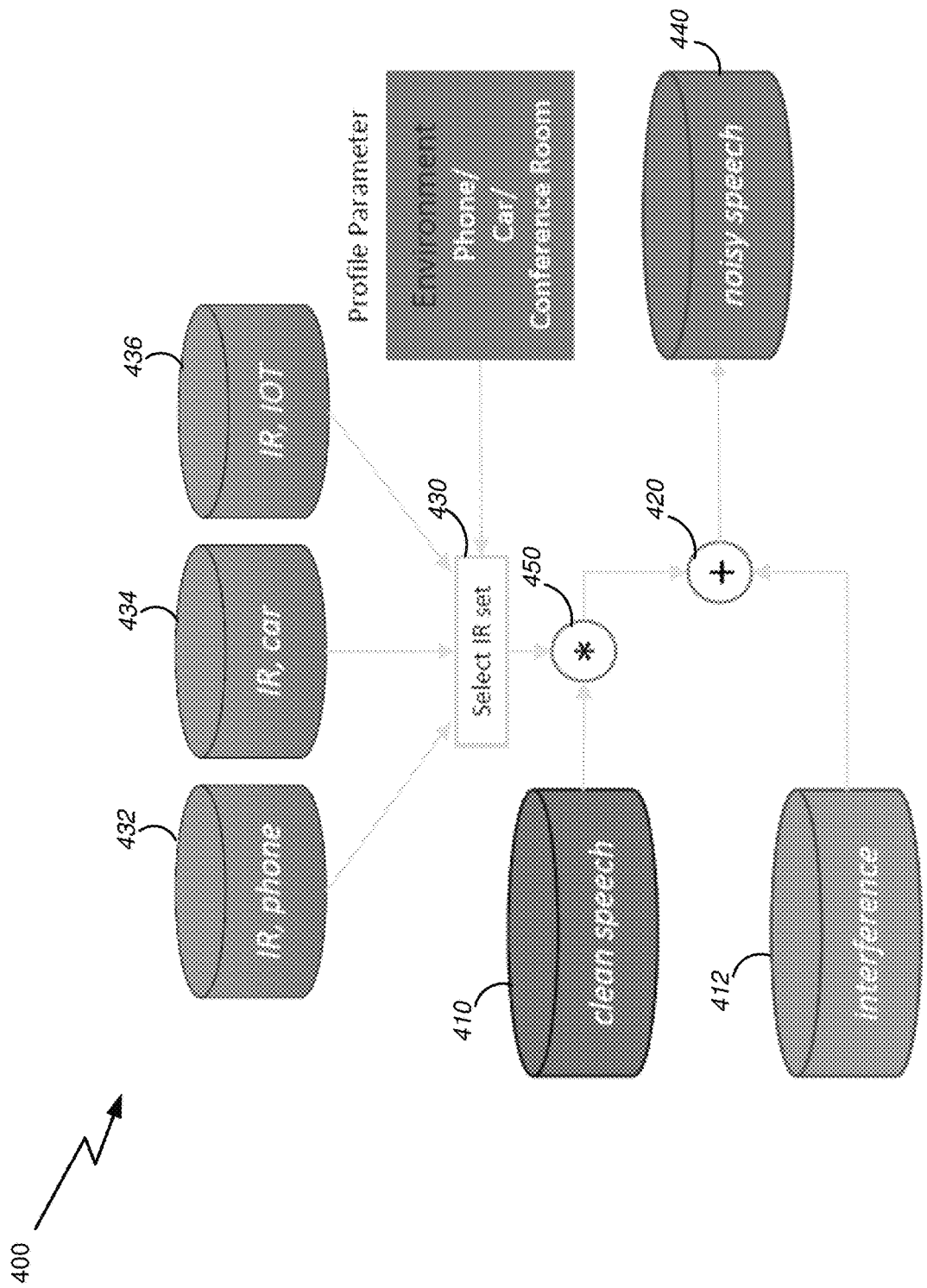
FIG. 4 is a schematic diagram of an example training data generation system.

Training the machine learning engine (e.g., the DNN 220) may be performed by using a clean speech (audio) spectrum as the desired output to be produced by applying the filter coefficients outputs (generated by the learning engine) to the noisy input audio signal representation. This approach, therefore, requires knowledge of the clean speech spectrum. Thus, noisy speech spectra, $X(t,\omega)$, are generated by taking clean speech $S(t,\omega)$ and noise $N(t,\omega)$ spectra from separate databases and mixing/combining them artificially, e.g., through a simple addition operation, namely, $X(t,\omega)=S(t,\omega)+N(t,\omega)$. FIG. 4 is a schematic diagram of an example training data generation system 400, showing clean speech (audio) data stored on a clean speech data repository 410 being combined (by a combining unit 420) with noise data stored on interference data repository 412. The clean audio data in the clean speech repository 410 may be digitized samples (e.g., in the time-domain) of call participants speaking under near optimal conditions (i.e., with little interference or noise from stationary and/or non-stationary noise sources). The recorded samples may have contained some level of stationary noise that has been removed. Thus, in some embodiments, the clean speech data may be produced by filtering noisy recording with conventional filters to remove different types of stationary noise. The noise data stored in the interference repository 412 may include digitized audio segments/samples of recording of non-stationary noise sources, e.g., nearby children's laughter or chatter, background chatter sounds, sounds made by various objects that may be in the vicinity of a microphone (sirens, car engines, etc.), as well as sounds that can be modeled as stationary or non-stationary noise (such as distant car traffic sounds, water streaming, windshield wiper noise, engine hums at different driving speeds, and other types of non-speech noise sources).

As further illustrated in FIG. 4, in order to consider different environments (e.g., phone, car, or a conference room in which IoT devices, such as smart speakers, are used), different mouth-to-microphone impulse responses may optionally be used during training. This is achieved by convolving clean headset speech (a time-domain signal) with an impulse response (IR) for the corresponding environment. Such IRs may be selected by an environment profile parameter selector 430. For example, in FIG. 4, the different impulse responses are stored on different storage devices 432, 434, and 436. The selector 430 can cause the generation of separate training samples from an individual clean audio sample (retrieved from the repository 410) by convolving (at 450) the time-domain audio sample with the different impulse responses associated with the different environments (or alternatively processing the samples and impulse response in a frequency domain representation). Those different samples (corresponding to different environments) can in turn be used to generate/spawn multiple additional samples (potentially from each sample generated through convolution with the respective impulse responses) by adding different interference components that may be stored in the interference repository 412. By generating training data through the combining of different interference sounds, and by filtering clean speech segments with impulse response filters corresponding to different environments, a large training corpus corresponding to many different types of noise and environments can be generated, thus providing a more comprehensive training data set to train the single noise reduction model to handle many different noise situations and produce output corresponding to a large variety of noise reduction profiles.

Generated samples, comprising clean audio samples filtered by different impulse responses representing different call environments, and combined with different noise/interference components, are stored in a noisy speech repository 440. Optionally, the repository 440 may construct data objects that comprise a clean audio sample (optionally filtered by an environment filter response), and one or more noisy counterparts of the clean audio segments. Training samples for the DNN 220 may subsequently be selected from the noisy speech repository 440.

Figure 5:
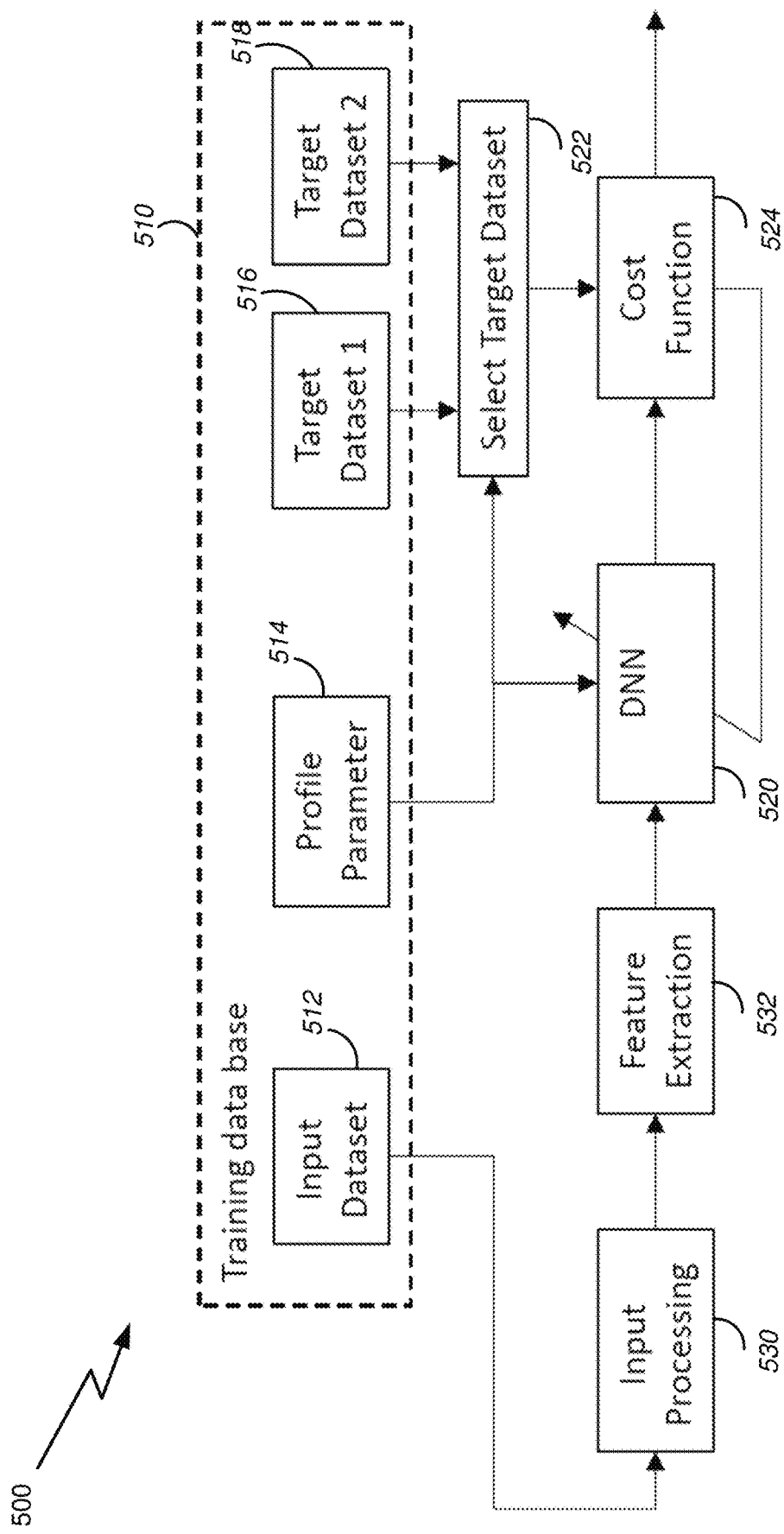
FIG. 5 is a schematic diagram illustrating a system configuration for training a machine learning system.

With reference next to FIG. 5, a schematic diagram 500 illustrating a system configuration for training a DNN 520 (which may be similar to the DNN 220 of FIG. 2, respectively) is provided. As noted, training data generated, for example, by the training data generation system 400 of FIG. 4, is stored in a training database 510 which may be the same as the noisy speech repository 440 of FIG. 4. The training database 510 may include training data records (objects) that include the noisy speech (audio) sample, such as noisy input dataset 512, produced by adding interference/noise components to a clean speech segments (optionally processed with impulse responses corresponding to various environments). The noisy input dataset is associated with one or more target datasets (in the example of FIG. 5, two target datasets 516 and 518 are illustrated, although each noisy input dataset in the training database 510 may be associated with any number of possible targets) that each corresponds to different noise reduction behaviors. A profile parameter record 514 includes data identifying the noise reduction profiles that should result in the respective target datasets (516 and 518, in this example) after the corresponding profile is provided to the DNN 520 to process the noisy input dataset 512. The target datasets 516 and 518 are generally two different audio samples generated from the same clean audio sample to form the noisy audio sample (provided from the clean speech repository 410), but with one or more of the noise components that were added to the clean audio sample excluded. For example, consider a situation where the DNN 520 is to be trained to suppress substantially all noise sounds from the noisy input (e.g., in situations where the noise reduction behavior is intended to be activated for a business call). For the business call behavior, the optimal target data would be the original clean audio sample (e.g., the target dataset 516), and would be associated with parameter values representative of a business call noise reduction behavior. Assume that another profile that the DNN 520 should be responsive to is a conference room noise reduction behavior in which no children laughter should be detected in the background, but where some low level chatter is permissible. For that situation, the target dataset representative of these characteristics would be the clean audio signal to which low level chatter interference (available from the interference repository 412) has been added, but for which the child laughter noisy audio is excluded. Thus, in the example of FIG. 5, the noisy input dataset 512 includes the clean audio sample combined with low level chatter noise and child laughter noise, the profile parameters identify a business call profile and a conference room profile, the target data set 516 comprises the original clean signal that is to be used to train the DNN 520 for business call behavior, and the target dataset 518 comprises the original clean signal combined with the low level chatter (but not the child laughter sounds) that is to be used to train the DNN 520 for conference room behavior During the training stage the noisy input dataset 512 may be processed by input processing unit 530 (which may be similar to the input processor 122 of FIG. 1) that is configured to perform signal conditioning and other initial processing and filtering operations on the audio signal (in this case, the noisy input dataset 512), as well as to transform a time-domain signal representation of the noisy input dataset 512 into a frequency-domain representation. The resultant processed noisy signal (transformed, in this example, to a frequency-domain representation) is provided to a feature extraction unit 532, which may be similar to the feature extraction unit 210 (shown in FIG. 2) of the noise suppression unit 124 of FIG. 1, and may be configured to extract from the processed noisy signal representation. produced by the input processing unit 530, representative (and typically compact) features. The extracted features may include one or more of, for example, complex signal spectra features, spectral magnitude features, log spectral magnitude features, log mel spectra features, mel-frequency cepstral features, etc.

The extracted features of the training audio sample of input dataset 512 are next provided to the DNN 520 that is being trained, along with the relevant profile parameter(s) representative of the noise reduction behavior associated with the training audio sample of input dataset 512 (the profile parameters can be represented in different ways; in this case the profile parameter value can have a value of 1 or 2 to select target dataset 1 or target dataset2, which correspond, respectively, to a business call profile, and a conference room profile). Assume that the for the current training sample, the DNN 520 is being trained to handle business call noise reduction behavior. The DNN 520 will thus produce, in response to the features extracted from the input dataset 512 and the profile parameter(s) representative of the business call profile, output corresponding to noise reduction filter coefficients (in accordance with the current DNN parameter values). The filter coefficients produced by the DNN 520 can next be applied to a representation of the noisy input signal (time-domain or frequency domain representation), and a resultant filtered output can be converted to the same domain representation as that of the target datasets 516 and 518. Since, in this example, the DNN 520 is being trained for a business call noise reduction behavior, the target dataset 516, which includes an audio sample representation of the original clean signal, is used to determine an error between the resultant filtered output produced by applying the predicted filter coefficients generated by the DNN 520 and the target dataset 516 (selected by a selector 522). The error between the target dataset 516 and the filtered output produced from processing the noisy input dataset 512 via the input processing unit 530, the feature extraction unit 532, and the DNN 520, are used to optimize the DNN parameters to minimize a cost function (implemented by a cost function unit 524). The cost function unit 524 computes updated DNN parameters, and updates those parameters (corresponding to neural network weights) of the DNN 520. This training process is iteratively repeated using other training datasets until some performance criterion is met. As noted, the minimization of the error value of the cost function used may be performed using, for example, a gradient descent process.

Figure 6:
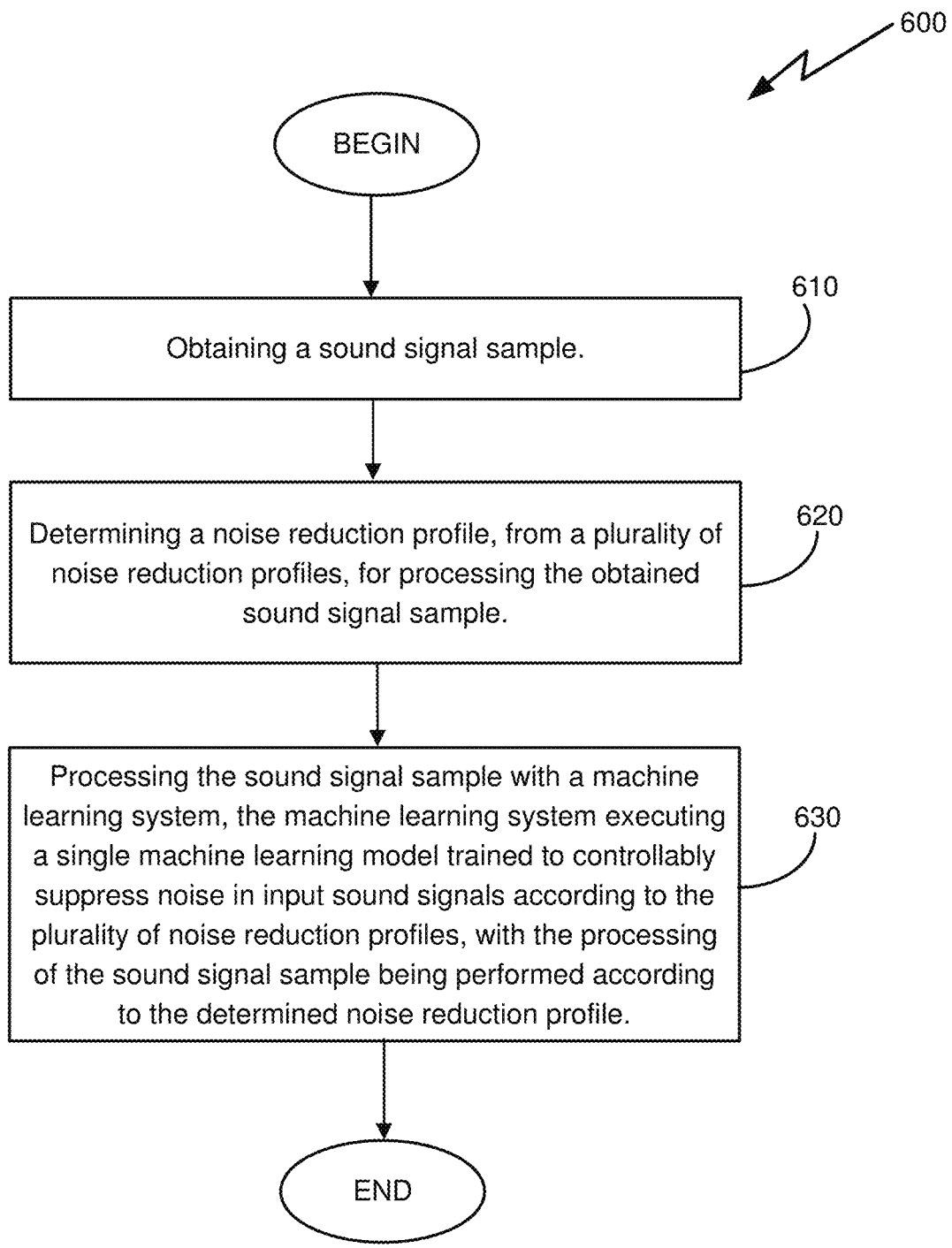
FIG. 6 is a flowchart of an example procedure for noise reduction.

With reference next to FIG. 6, a flowchart of an example procedure 600 for noise reduction is shown. The procedure 600 includes obtaining 610 a sound signal sample. Obtaining the sound signal sample may include, for example, converting, by an acoustic transducer device (e.g., a microphone), a raw sound sample into a time-domain sound signal, applying input processing (e.g., by the input processor 122 of FIG. 1) to the time-domain sound signal to produce a resultant processed representation, and extracting features (e.g., by the feature extraction unit such as the unit/section 210 of FIG. 2) from the resultant processed representation to produce the sound signal sample processed by the machine learning system. In such embodiments, applying input processing to the time-domain sound signal may include one or more of, for example, performing signal conditioning on the time-domain sound signal, transforming the time-domain sound signal into a transformed domain representation, performing echo cancellation on the time-domain sound signal, and/or performing beamforming or array signal processing on the time-domain sound signal. Transforming the time-domain sound signal into the transformed domain representation may include transforming the time-domain sound signal into a frequency-domain representation on which frequency-domain noise reduction filtering, generated by the machine learning system, is applied.

In various examples, extracting the features may include deriving one or more of, for example, complex signal spectra features, spectral magnitude features, log spectral magnitude features, log mel spectra features, and/or mel-frequency cepstral coefficients.

With continued reference to FIG. 6, the procedure 600 additionally includes determining 620 a noise reduction profile, from a plurality of noise reduction profiles, for processing the obtained sound signal sample, and processing 630 the sound signal sample with a machine learning system, the machine learning system executing (implementing) a single machine learning model trained to controllably suppress noise in input sound signals according to the plurality of noise reduction profiles, with the processing of the sound signal sample being performed according to the determined noise reduction profile. The machine learning system may include an artificial neural network (such as the DNN networks discussed in the present disclosure).

As noted, the machine learning system is configured to dynamically determine time-variant filter coefficients (e.g., for a Wiener filter) responsive to the noisy input signal and the determined noise reduction behavior parameter. The determined filter coefficients are then used to filter the incoming input sample segment being processed to yield a noise-suppressed signal. Thus, in such embodiments, processing the sound signal with the machine learning system may include determining, by the machine learning system, filter coefficients for a time-varying linear filter based on at least part of the sound signal sample and the determined noise reduction profile, and applying the determined filter coefficients to the at least part of the sound signal sample to yield a noise suppressed signal. The noise reduction profile may include at least one identifier with a value selected from a discrete set of values that each represents a different one of a plurality of profile types requiring different noise reduction behavior. The plurality of noise reduction profiles may include one or more of, for example, a business call profile configured to suppress sounds produced by sources different from an intended speaker of a business call, a family call profile configured to include sounds produced by multiple participants located at one end of a family-related call, a hands-free call profile, a single-speaker profile, a multi-speaker profile, a profile for a call conducted from a car, a profile for a call conducted from a conference room, and/or a voice-recognition profile configured to suppress noise to allow voice recognition of one or more participants of a call to be recognized.

In various examples, determining the noise reduction profile may include selecting the noise reduction profile from the plurality of noise reduction profiles according to an input parameter, provided to the machine learning system, specifying the noise reduction profile. The noise reduction profile may include at least one noise suppression property identifier representative of characteristics of desired level of noise suppression. The at least one noise suppression property identifier may be set to a value from a range of values representative of aggressiveness level at which noise suppression processing is to be performed. In various examples, determining the noise reduction profile may include determining contextual information associated with a sound source, and determining the noise reduction profile based, at least in part, on the determined contextual information associated with the sound source. In such examples, determining the contextual information may include one or more of deriving one or more elements of the contextual information based on sensor data measured by one or more sensors, and receiving user information, via a user interface device, representative of one or more other elements of the contextual information.

The machine learning system may be trained to suppress noise based on configuring coefficients of the machine learning system according to input noisy training samples, respective input noise reduction profiles corresponding to the input noisy training samples, and corresponding output training samples in which at least some noise components of the input noisy training samples have been suppressed according to the corresponding input noise reduction profiles. At least one of the input noisy training samples may be synthesized from a clean input sound sample combined with respective separate independent noise signals, and the corresponding output training samples may be the clean input sound sample.

As noted, the machine learning system is generally configured to implement a single, universal machine learning model that handles all the different profiles (and adjusts the output behavior of the machine learning according to the noise reduction profile parameters that the machine learning system receives as input). In other words, the implementations described herein do not need to change models for different noise reduction profiles, and can therefore instantly (i.e., on-the-fly, and in real-time) switch to a different noise reduction behavior. Thus, in various example, the procedure 600 further includes determining at a later time a different noise reduction profile, from the plurality of noise reduction profiles, for processing subsequently obtained one or more sound signal samples, and processing the subsequently obtained one or more sound signal samples with the machine learning system according to the different noise reduction profile. In such example embodiments, the machine learning system may be configured with a universal set of parameters, defining operation of the machine learning system, that are used for all of the plurality of the noise reduction profiles.

Figures 7A, 7B:
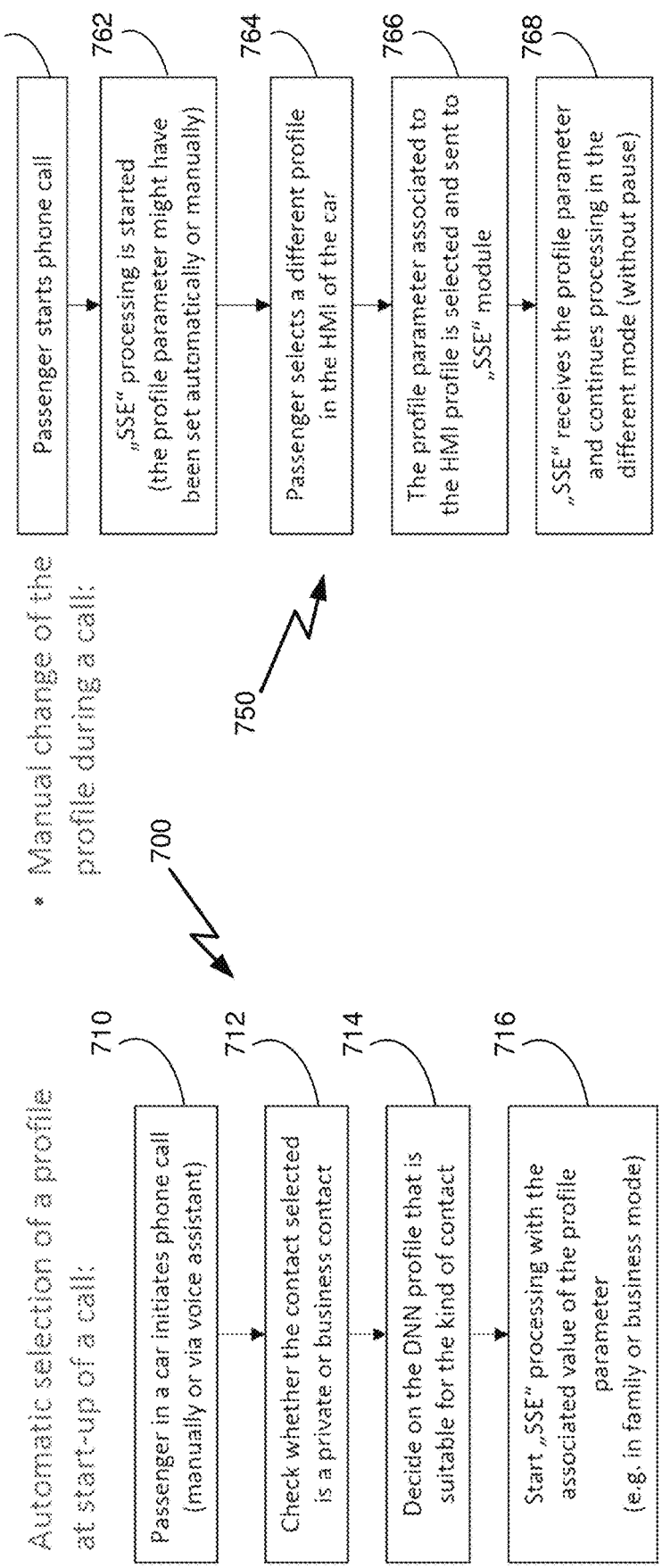
FIG. 7A is a flowchart of an example procedure for automatic selection of a profile at start-up of a call.
FIG. 7B is a flowchart of an example procedure is which the profile information that is used to control the noise reduction behavior of a machine learning system changes.

FIGS. 7A and 7B provide flowcharts for two example use scenarios of the systems and implementations described herein. Particularly, FIG. 7A is a flowchart of an example procedure 700 for automatic selection of a profile at start-up of a call. As shown, FIG. 7A deals with a situation involving a car passenger conducting a call. The procedure 700 thus includes the car passenger initiating 710 a call (either manually or via a voice assistant that may be included with a human-machine interface such as the HMI 102 schematically depicted in FIG. 1). The contact selected is then analyzed (at 712) to determine whether the call is a private or business contact (this analysis may be performed automatically by, for example, the HMI in the car). The noise reduction profile (e.g., the profile of the DNN of the noise suppression unit 124 of FIG. 1 that is to be activated) is then determined (at 714). This determination can also be made automatically by the HMI based on the nature of the contact and other contextual information. As noted, the analysis and determination of which noise reduction profile to invoke or activate may be implemented using a machine learning model (different from the noise reduction model implemented as DNN 220 of FIG. 2, respectively) that outputs labels and/or profile information parameters that are provided as input to the noise reduction machine learning system. Having determined the noise reduction profile to be activated (as well as other profile information parameters, such as aggressivity level of the noise reduction and/or other noise reduction characteristics), speech signal enhancement (SSE) processing (performed by, for example, the SSE unit 120 of FIG. 1) is activated (at 716), with the DNN unit of the SSE being activated to cause noise reduction operations responsive to the noise reduction profile determined at 714.

FIG. 7B is a flowchart of another example procedure 750 is which the profile information that is used to control the noise reduction behavior of the DNN unit changes. In the example of FIG. 7B, a car passenger starts a phone call (at 760). SSE processing is then commenced (at 762), possibly based on profile parameters that have previously been determined or set, or based on automatic determination according to current contextual information/conditions (e.g., selection of a business call noise reduction profile in response to identification of the intended recipient/callee as a business contact). The commencement of SSE processing based, in this example, on a business call setting causes the DNN to produce filter coefficients configured to remove or attenuate audio content corresponding from sources other than the initiating caller.

Suppose, in this example, that, notwithstanding the initial determination of a business call noise reduction profile, the caller decides that a conference call noise reduction profile should be used instead (e.g., if another person who needs to participate in the call is with the caller). Accordingly, the caller may actively specify (at 764), manually or through voice interaction with the HMI, to change the profile to a conference mode noise reduction profile. The HMI then communicates (at 766) the newly selected noise reduction information (e.g., noise reduction profile parameters) to the SSE unit. The SSE unit receives the profile parameters (at 768), which causes the DNN to instantly (i.e., without pause, and without having to download a new set of DNN parameters corresponding to a different model implementing a different noise reduction profile) adjust its output to produce filter coefficients that cause noise reduction filtering consistent with the newly selected noise reduction profile.

Figure 8:
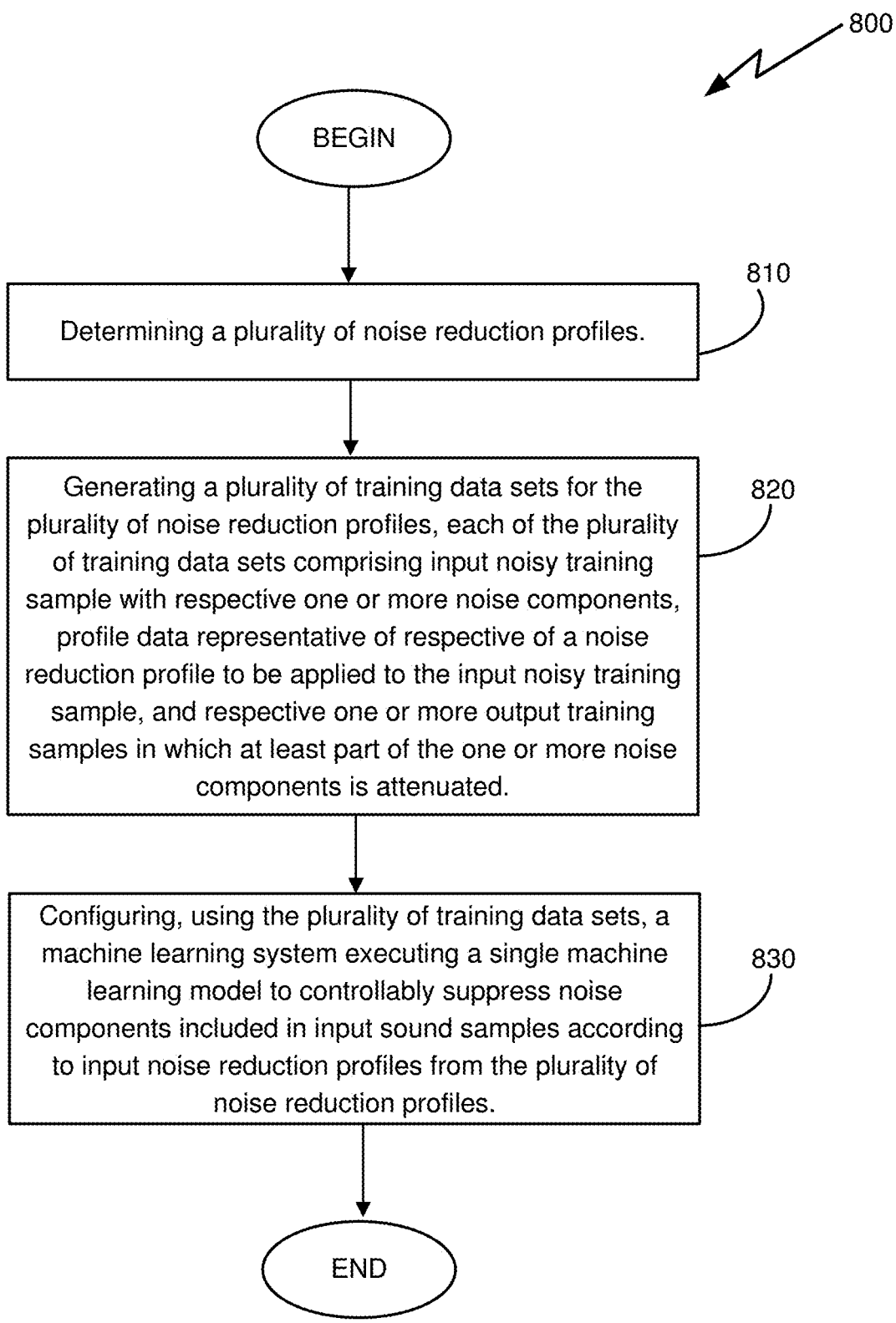
FIG. 8 is a flowchart of an example procedure for implementing (e.g., training) a universal noise reduction machine learning model.

With reference next to FIG. 8, a flowchart of an example procedure 800 for implementing a universal noise reduction machine learning model is shown. The procedure 800 includes determining 810 a plurality of noise reduction profiles, and generating 820 a plurality of training data sets for the plurality of noise reduction profiles, with each of the plurality of training data sets comprising input noisy training sample with respective one or more noise components, profile data representative of respective of a noise reduction profile to be applied to the input noisy training sample, and a respective training sample in which at least part of the one or more noise components is attenuated (as depicted by the training database 510 of FIG. 5). The procedure 800 further includes configuring 830, using the plurality of training data sets, a machine learning system executing a single machine learning model to controllably suppress noise components included in input sound samples according to input noise reduction profiles from the plurality of noise reduction profiles (i.e., the training of the machine learning system is to produce output dependent, in part, on the determined noise reduction profile, which itself may be represented through one or more parameters).

As discussed in relation to FIG. 4, in various examples, generating the plurality of training data sets may include obtaining an initial clean sound sample (e.g., from the clean speech repository 410), and synthesizing, for at least one of the plurality of training data sets, the input noisy training sample by combining the initial clean sound sample with a noise signal selected from a database of noise components (e.g., the interference repository 412), the selected noise signal corresponding to the profile data for the at least one of the plurality of training data sets. The respective output training sample for the at least one of the training data sets may be the obtained initial clean sound sample.

In an example embodiment, the procedure 800 may further include applying to the initial clean sound sample one of a plurality of impulse response filters, representative of noise characteristics in different environments, to produce a filtered sound sample. In such an example embodiment synthesizing the input noisy training sample may include combining the filtered sound sample with the selected noise signal. In another example embodiment, obtaining the initial clean sound sample may include recording an audio segment, and filtering the recorded audio segment with one or more filters to attenuate one or more stationary noise components included in the recorded audio segment.

The plurality of noise reduction profiles may include one or more of, for example, a business call profile configured to suppress sounds produced by sources different from an intended speaker of a business call, a family call profile configured to include sounds produced by multiple participants located at one end of a family-related call, a hands-free call profile, a single-speaker profile, a multi-speaker profile, a profile for a call conducted from a car, a profile for a call conducted from a conference room, and/or a voice-recognition profile configured to suppress noise to allow voice recognition of one or more participants of a call to be recognized.

In various examples of the procedure 800, the machine learning system configured to controllably suppress noise components included in input sound samples is configured to determine filter coefficients for a time-varying linear filter based on at least part of the input sound signal samples and one or more of input noise reduction profiles; and apply the determined filter coefficients to the at least part of the sound signal samples to yield a noise suppressed signal.

Implementation described herein, including implementations using neural networks, can be realized on any computing platform, including computing platforms that include one or more microprocessors, microcontrollers, and/or digital signal processors that provide processing functionality, as well as other computation and control functionality. The computing platform can include one or more CPU's, one or more graphics processing units (GPU's, such as NVIDIA GPU's), and may also include special purpose logic circuitry, e.g., an FPGA (field programmable gate array), an ASIC (application-specific integrated circuit), a DSP processor, an accelerated processing unit (APU), an application processor, customized dedicated circuitry, etc., to implement, at least in part, the processes and functionality for the neural network, processes, and methods described herein. The computing platforms typically also include memory for storing data and software instructions for executing programmed functionality within the device. Generally speaking, a computer accessible storage medium may include any non-transitory storage media accessible by a computer during use to provide instructions and/or data to the computer. For example, a computer accessible storage medium may include storage media such as magnetic or optical disks and semiconductor (solid-state) memories, DRAM, SRAM, etc. The various learning processes implemented through use of the neural networks may be configured or programmed using TensorFlow (a software library used for machine learning applications such as neural networks). Other programming platforms that can be employed include keras (an open-source neural network library) building blocks, NumPy (an open-source programming library useful for realizing modules to process arrays) building blocks, etc.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate in the context of the systems, devices, circuits, methods, and other implementations described herein.

As used herein, including in the claims, "or" as used in a list of items prefaced by "at least one of" or "one or more of" indicates a disjunctive list such that, for example, a list of "at least one of A, B, or C" means A or B or C or AB or AC or BC or ABC (i.e., A and B and C), or combinations with more than one feature (e.g., AA, AAB, ABBC, etc.). Also, as used herein, unless otherwise stated, a statement that a function or operation is "based on" an item or condition means that the function or operation is based on the stated item or condition and may be based on one or more items and/or conditions in addition to the stated item or condition.

A number of embodiments of the invention have been described. Nevertheless, it is to be understood that the foregoing description is intended to illustrate and not to limit the scope of the invention, which is defined by the scope of the following claims. Accordingly, other embodiments are also within the scope of the following claims. For example, various modifications may be made without departing from the scope of the invention. Additionally, some of the steps described above may be order independent, and thus can be performed in an order different from that described.

What is claimed is:

1. A method for noise reduction comprising:
   obtaining a sound signal sample;
   determining a noise reduction profile, from a plurality of noise reduction profiles, for processing the obtained sound signal sample;
   processing the sound signal sample with a machine learning system to produce a noise suppressed signal, the machine learning system executing a single machine learning model trained to controllably suppress noise in input sound signals according to the plurality of noise reduction profiles, the processing of the sound signal sample performed according to the determined noise reduction profile;
   obtaining a second sound signal sample;
   determining a second noise reduction profile from the plurality of noise reduction profiles for processing the second obtained sound signal sample; and
   switching from the noise reduction profile to the second noise reduction profile without changing from the single machine learning model to suppress noise in the input sound signals received after the switching using the second noise reduction profile,
   wherein the noise reduction profile and the second noise reduction profile each comprise at least one identifier with a value selected from a discrete set of values that each represents a different one of a plurality of profile types requiring different noise reduction behavior.

2. The method of claim 1, wherein processing the sound signal with the machine learning system comprises:
determining, by the machine learning system, filter coefficients for a time-varying linear filter based on at least part of the sound signal sample and the determined noise reduction profile; and
applying the determined filter coefficients to the at least part of the sound signal sample to yield a noise suppressed signal.

3. The method of claim 1, wherein the machine learning system comprises an artificial neural network.

4. The method of claim 1, wherein the plurality of noise reduction profiles comprises one or more of: a business call profile configured to suppress sounds produced by sources different from an intended speaker of a business call, a family call profile configured to include sounds produced by multiple participants located at one end of a family-related call, a hands-free call profile, a single-speaker profile, a multi-speaker profile, a profile for a call conducted from a car, a profile for a call conducted from a conference room, and a voice-recognition profile configured to suppress noise to allow voice recognition of one or more participants of a call to be recognized.

5. The method of claim 1, wherein determining the noise reduction profile comprises:
selecting the noise reduction profile from the plurality of noise reduction profiles according to an input parameter, provided to the machine learning system, specifying the noise reduction profile.

6. The method of claim 1, wherein determining the noise reduction profile comprises:
determining contextual information associated with a sound source; and
determining the noise reduction profile based, at least in part, on the determined contextual information associated with the sound source.

7. The method of claim 6, wherein determining the contextual information comprises one or more of:
deriving one or more elements of the contextual information based on sensor data measured by one or more sensors; and
receiving user information, via a user interface device, representative of one or more other elements of the contextual information.

8. The method of claim 1, wherein obtaining the sound signal sample comprises:
converting, by an acoustic transducer device, a raw sound sample into a time-domain sound signal;
applying input processing to the time-domain sound signal to produce a resultant processed representation; and
extracting features from the resultant processed representation to produce the sound signal sample.

9. The method of claim 8, wherein applying input processing to the time-domain sound signal comprises one or more of:
performing signal conditioning on the time-domain sound signal;
transforming the time-domain sound signal into a transformed domain representation;
performing echo cancellation on the time-domain sound signal; or
performing beamforming or array signal processing on the time-domain sound signal.

10. The method of claim 9, wherein transforming the time-domain sound signal into the transformed domain representation comprises:
transforming the time-domain sound signal into a frequency-domain representation on which frequency-domain noise reduction filtering, generated by the machine learning system, is applied.

11. The method of claim 10, wherein extracting the features comprises:
deriving from the frequency domain representation one or more of: complex signal spectra features, spectral magnitude features, log spectral magnitude features, log mel spectra features, or mel-frequency cepstral coefficients.

12. The method of claim 1, wherein the machine learning system is trained to controllably suppress noise by configuring coefficients of the machine learning system according to input noisy training samples, respective input noise reduction profiles corresponding to the input noisy training samples, and corresponding output training samples in which at least some noise components of the input noisy training samples have been suppressed according to the corresponding input noise reduction profiles.

13. The method of claim 12, wherein at least one of the input noisy training samples is synthesized from a clean input sound sample combined with respective separate independent noise signals, and wherein the corresponding output training samples include the clean input sound sample.

14. The method of claim 13, further comprising forming the noisy training samples, including synthesized a noisy training sample from a clean input sound sample combined with an independent noise signal, and training the machine learning system using input noisy training samples associated with a plurality of input noise reduction profiles.

15. The method of claim 12, further comprising training the machine learning system using input noisy training samples corresponding to a plurality of input noise reduction profiles.

16. The method of claim 1, further comprising:
determining at a later time a different noise reduction profile, from the plurality of noise reduction profiles, for processing subsequently obtained one or more sound signal samples; and
processing the subsequently obtained one or more sound signal samples with the machine learning system according to the different noise reduction profile, wherein the machine learning system is configured with a universal set of parameters, defining operation of the machine learning system, that are used for all of the plurality of the noise reduction profiles.

17. The method of claim 1 further comprising:
determining a plurality of noise reduction profiles;
generating a plurality of training data sets for the plurality of noise reduction profiles, each of the plurality of training data sets comprising an input noisy training sample with respective one or more noise components, profile data representative of a respective noise reduction profile to be applied to the input noisy training sample, and a respective output training sample in which at least part of the one or more noise components is attenuated; and
configuring, using the plurality of training data sets, the machine learning system to execute a single machine learning model to controllably suppress noise components included in input sound samples according to input noise reduction profiles from the plurality of noise reduction profiles.

18. The method of claim 17, wherein generating the plurality of training data sets comprises:
obtaining an initial clean sound sample; and
synthesizing, for at least one of the plurality of training data sets, the input noisy training sample by combining the initial clean sound sample with a noise signal selected from a database of noise components, the selected noise signal corresponding to the profile data for the at least one of the plurality of training data sets;
wherein the respective output training sample for the at least one of the plurality of training data sets is the obtained initial clean sound sample.

19. The method of claim 18, further comprising:
applying to the initial clean sound sample one of a plurality of impulse response filters, representative of noise characteristics in different environments, to produce a filtered sound sample;
wherein synthesizing the input noisy training sample comprises combining the filtered sound sample with the selected noise signal.

20. The method of claim 18, wherein obtaining the initial clean sound sample comprises:
recording an audio segment; and
filtering the recorded audio segment with one or more filters to attenuate one or more stationary noise components included in the recorded audio segment.

21. The method of claim 17, wherein the plurality of noise reduction profiles comprises one or more of: a business call profile configured to suppress sounds produced by sources different from an intended speaker of a business call, a family call profile configured to include sounds produced by multiple participants located at one end of a family-related call, a hands-free call profile, a single-speaker profile, a multi-speaker profile, a profile for a call conducted from a car, a profile for a call conducted from a conference room, or a voice-recognition profile configured to suppress noise to allow voice recognition of one or more participants of a call to be recognized.

22. The method of claim 17, wherein the machine learning system configured to controllably suppress noise components included in input sound samples is configured to:
determine filter coefficients for a time-varying linear filter based on at least part of the input sound samples and one or more of input noise reduction profiles; and
apply the determined filter coefficients to the at least part of the input sound samples to yield a noise suppressed signal.

23. The method of claim 1, further comprising configuring the machine learning model with configurable coefficients for processing signals according to a plurality of noise reduction profiles.

24. The method of claim 23, wherein processing the sound signal sample comprises providing the noise reduction profile as a first input to the configured machine learning model.

25. The method of claim 24, wherein processing the sound signal sample further comprises providing successive segments of the sound signal sample as a second input to the configured machine learning model, and determining respective filter coefficients from output of said model, and further comprises configuring a filter with the filter coefficients and processing the sound signal sample with the configured filter to yield the noise suppressed signal.

26. A method for noise reduction comprising:
obtaining a sound signal sample;
determining a noise reduction profile, from a plurality of noise reduction profiles, for processing the obtained sound signal sample;
processing the sound signal sample with a machine learning system to produce a noise suppressed signal, the machine learning system executing a single machine learning model trained to controllably suppress noise in input sound signals according to the plurality of noise reduction profiles, the processing of the sound signal sample performed according to the determined noise reduction profile;
obtaining a second sound signal sample;
determining a second noise reduction profile from the plurality of noise reduction profiles for processing the second obtained sound signal sample; and
switching from the noise reduction profile to the second noise reduction profile without changing from the single machine learning model to suppress noise in the input sound signals received after the switching using the second noise reduction profile,
wherein the noise reduction profile comprises at least one noise suppression property identifier representative of characteristics of desired level of noise suppression.

27. The method of claim 26, wherein the at least one noise suppression property identifier is set to a value from a range of values representative of aggressiveness level at which noise suppression processing is to be performed.

28. A noise reduction system comprising:
an audio acquisition section to obtain a sound signal sample;
a machine learning engine configured to perform noise reduction operations on audio samples; and
a noise reduction controller in electrical communication with the audio acquisition section, the noise reduction controller configured to:
determine a noise reduction profile, from a plurality of noise reduction profiles, for processing the obtained sound signal sample;
process the sound signal sample with the machine learning engine, the machine learning engine executing a single machine learning model trained to controllably suppress noise in input sound signals according to the plurality of noise reduction profiles, the processing of the sound signal sample performed according to the determined noise reduction profile;
obtain a second sound signal sample;
determine a second noise reduction profile from the plurality of noise reduction profiles for processing the second obtained sound signal sample; and
switch from the noise reduction profile to the second noise reduction profile without changing from the single machine learning model to suppress noise in the input sound signals received after the switching using the second noise reduction profile.

29. The system of claim 28, wherein the noise reduction controller configured to process the sound signal sample is configured to:
determine, by the machine learning engine, filter coefficients for a time-varying linear filter based on at least part of the sound signal sample and the determined noise reduction profile; and
apply the determined filter coefficients to the at least part of the sound signal sample to yield a noise suppressed signal.

30. The system of claim 28, wherein the machine learning engine comprises an artificial neural network.

31. The system of claim 28, wherein the plurality of noise reduction profiles comprises one or more of: business call profile configured to suppress sounds produced by sources different from an intended speaker of a business call, a family call profile configured to include sounds produced by multiple participants located at one end of a family-related call, a hands-free call profile, a single-speaker profile, a multi-speaker profile, a profile for a call conducted from a car, a profile for a call conducted from a conference room, and a voice-recognition profile configured to suppress noise to allow voice recognition of one or more participants of a call to be recognized.

32. The system of claim 28, wherein the noise reduction controller configured to determine the noise reduction profile is configured to perform one or more of:
   determine contextual information associated with a sound source, and determine the noise reduction profile based, at least in part, on the determined contextual information associated with the sound source; or
   select the noise reduction profile from the plurality of noise reduction profiles according to an input parameter, provided to the machine learning engine, specifying the noise reduction profile.

33. The system of claim 28, wherein the noise reduction controller further comprising:
   determining at a later time a different noise reduction profile, from the plurality of noise reduction profiles, for processing subsequently obtained one or more sound signal samples; and
   processing the subsequently obtained one or more sound signal samples with the machine learning engine according to the different noise reduction profile, wherein the machine learning system is configured with a universal set of parameters, defining operation of the machine learning engine, that are used for all of the plurality of the noise reduction profiles.

34. The noise reduction system of claim 28 further comprising:
   one or more memory storage devices to store audio samples training data; and
   a controller to:
   determine the plurality of noise reduction profiles;
   generate a plurality of training data sets for the plurality of noise reduction profiles, each of the plurality of training data sets comprising input noisy training sample with respective one or more noise components, profile data representative of a respective noise reduction profile to be applied to the input noisy training sample, and a respective output training sample in which at least part of the one or more noise components is attenuated; and
   configure, using the plurality of training data sets, the machine learning engine to implement a single machine learning model to controllably suppress noise components included in input sound samples according to input noise reduction profiles from the plurality of noise reduction profiles.

35. The system of claim 34, wherein the controller configured to generate the plurality of training data sets is configured to:
   obtain an initial clean sound sample; and
   synthesize, for at least one of the plurality of training data sets, the input noisy training sample by combining the initial clean sound sample with a noise signal selected from a database of noise components, the selected noise signal corresponding to the profile data for the at least one of the plurality of training data sets;
   wherein the respective output training sample for the at least one of the training data sets is the obtained initial clean sound sample.

36. A non-transitory computer readable media storing a set of instructions, executable on at least one programmable device, to:
   obtain a sound signal sample;
   determine a noise reduction profile, from a plurality of noise reduction profiles, for processing the obtained sound signal sample;
   process the sound signal sample with a machine learning system to produce a noise suppressed signal, the machine learning system executing a single machine learning model trained to controllably suppress noise in input sound signals according to the plurality of noise reduction profiles, the processing of the sound signal sample performed according to the determined noise reduction profile;
   obtain a second sound signal sample;
   determine a second noise reduction profile from the plurality of noise reduction profiles for processing the second obtained sound signal sample; and
   switch from the noise reduction profile to the second noise reduction profile without changing from the single machine learning model to suppress noise in the input sound signals received after the switching using the second noise reduction profile.

37. The non-transitory computer readable media of claim 36, storing further instructions, executable on at least one programmable device, to:
   determine the plurality of noise reduction profiles;
   generate a plurality of training data sets for the plurality of noise reduction profiles, each of the plurality of training data sets comprising an input noisy training sample with respective one or more noise components, profile data representative of a respective noise reduction profile to be applied to the input noisy training sample, and a respective output training sample in which at least part of the one or more noise components is attenuated; and
   configure, using the plurality of training data sets, the machine learning system to execute a single machine learning model to controllably suppress noise components included in input sound samples according to input noise reduction profiles from the plurality of noise reduction profiles.

\* \* \* \* \*